United States Patent [19]

Otokawa

[11] Patent Number: 4,905,108

[45] Date of Patent: Feb. 27, 1990

[54] ROTARY HEAD TYPE REPRODUCING APPARATUS WITH TRACKING CONTROL FUNCTION

[75] Inventor: Mitsuhiro Otokawa, Kanagawa, Japan

[73] Assignee: Canon Kabushiki Kaisha, Tokyo, Japan

[21] Appl. No.: 116,520

[22] Filed: Nov. 3, 1987

[30] Foreign Application Priority Data

Nov. 6, 1986 [JP] Japan ................................ 61-262731

[51] Int. Cl.$^4$ ........................ G11B 15/467; G11B 5/53
[52] U.S. Cl. ................................. 360/77.14; 360/10.2; 360/74.4; 360/73.05
[58] Field of Search ............................ 360/10.1–10.3, 360/18, 27, 74.1, 74.4, 73, 77, 61, 64, 77.12–77.17

[56] References Cited

U.S. PATENT DOCUMENTS

| | | | |
|---|---|---|---|
| 4,587,581 | 5/1986 | Serafini | 360/77 |
| 4,686,589 | 8/1987 | Takimoto | 360/77 |
| 4,743,921 | 5/1988 | Sato | 360/77 |

Primary Examiner—Vincent P. Canney
Assistant Examiner—Steven R. Garland
Attorney, Agent, or Firm—Robin, Blecker, Daley & Driscoll

[57] ABSTRACT

A rotary head type reproducing apparatus wherein, three rotary heads are arranged to be capable of simultaneously tracing different parts of many parallel tracks formed on a record bearing medium, the parts differing from each other both in the transverse and longitudinal directions of the tracks; among the three heads, a first head is positioned in the middle part of each track in the direction of the width thereof; a first tracking error signal is formed to represent a level difference between pilot signals reproduced by the first head from second and third tracks adjoining both sides of a first track which is being traced by the first head; a second tracking error signal is formed to represent a level difference between pilot signals reproduced from the second and third tracks by second and third heads which are other than the first head; and tracking control is accomplished by using both the first and second tracking error signals.

6 Claims, 4 Drawing Sheets

ROTARY HEAD TYPE REPRODUCING APPARATUS WITH TRACKING CONTROL FUNCTION

BACKGROUND OF THE INVENTION

1. Field of the Invention

This invention relates to an apparatus for reproducing an information signal with a plurality of rotary heads from a record bearing medium on which the information signal and pilot signals are recorded in many tracks which are formed in parallel to each other.

2. Description of the Related Art:

Techniques for reduction in size and an increase in recording density of magnetic recording and/or reproducing apparatuses have greatly advanced during recent years. VTRs having many magnetic heads arranged on a compact rotary drum have come to make their debut on the market. With regard to high density recording, many VTRs are now arranged to permit recording over a longer period of time on the conventional magnetic tape by reducing the tape travel speed to ½ or ⅓ thereof and recording track pitch also to ½ or ⅓ with the width of heads narrowed.

FIG. 1 of the accompanying drawings shows by way of example a compact drum having many magnetic heads mounted thereon as mentioned above. The illustration includes the rotary drum 15; tape guide posts 16 and 17; a magnetic tape employed as a magnetic record bearing medium; and magnetic heads A, B, C and D. The heads A and C are arranged to have the same azimuth angle and the heads B and D each to have another common azimuth angle.

Each of the magnetic heads A, B, C and D begins recording at a point near the tape guide post 16 in the position where the head A is shown in FIG. 1. Then, one field portion of a video signal is completely recorded with the head A having turned around 270 degrees coming to the position where the head D is shown in the drawing. When the magnetic head A thus completes the recording, for example, the magnetic head B which is disposed 90 degrees ahead of the head A is located at the record start point and thus begins recording at the same time as the completion of recording by the head A. Recording is thus performed by the magnetic heads in the order of the heads as follows: A - B - C - D. Recording tracks are then formed in a pattern as represented by FIG. 2.

In cases where the magnetic heads are arranged to have a narrower width to be suited for a recording mode having a slower tape travel speed, if recording is performed in an ordinary recording mode allowing the tape to travel at an ordinary speed, there arise guard bands between adjacent recording tracks as shown in FIG. 3.

In reproducing a recorded signal with a VTR of the kind performing tracking control by a known method called a four-frequency method, pilot signals are reproduced not only from a recording track which is under control and is mainly traced by a reproducing magnetic head but also from other tracks adjoining the mainly traced track on both sides thereof. A control signal for tracking control is obtained by comparing the reproduced levels of two different pilot signals which are recorded in the two adjoining tracks. The tracking control is thus accomplished in accordance with the control signal.

Then, in case that the recording tracks having the above stated guard bands interposed in between them are traced by the narrow head, the tracking control cannot be adequately accomplished as it is sometimes impossible to obtain the reproduced pilot signal at a sufficiently high level from the above stated two adjoining tracks.

To solve this problem, a technique has been contrived for the VTR of the kind having the head arrangement as shown in FIG. 1. to obtain an adequate tracking control signal by using two magnetic heads disposed ahead and behind a video signal reproducing head for obtaining the pilot signals from the two adjoining tracks. A similar technique has been disclosed in U.S. patent application Ser. No. 805,959, filed on Dec. 5, 1985, now abandoned. The details of this technique are as follows:

In the case of the VTR having four magnetic heads as shown in FIG. 1; for example, each head is disposed away from another a distance corresponding to ⅓ field portion of the video signal in the longitudinal direction of the recording tracks. Therefore, as shown in FIG. 4, the magnetic head D obtains a pilot signal within a ⅓ field area from the start point of a front track and the magnetic head B obtains another pilot signal within a ⅓ field area before the end of a rear track when the magnetic head A is reproducing the video signal from another ⅓ field area located in the middle of a mainly traced track.

With two different pilot signals reproduced from the two adjoining tracks in this manner, a tracking control signal is obtained by comparing these pilot signals with each other. FIG. 5 is a chart showing a timing at which use of the magnetic heads is switched from one head over to another during a reproducing operation. In FIG. 5, hatched parts represent a video signal reproducing period. Parts "a" and "b" represent periods during which the pilot signals are reproduced from the front and rear tracks for obtaining the tracking control signal.

Generally, VTRs are arranged to have interchangeability among them. A video signal recorded on a magnetic tape by one VTR is sometimes reproduced by another VTR. In that instance, the recording direction of recording tracks on the magnetic tape sometimes differs from the scanning locus of a reproducing magnetic head. In some cases, for example, the linearity of the scanning locus of the head is impaired in relation to recording tracks.

The pilot signals from the adjoining tracks are obtainable by the front and rear heads only while the reproducing heads is tracing the ⅓ field area located in the middle of the main track. Therefore, in the event of the impaired linearity, tracking control cannot be adequately accomplished. Then, the reproduced video signal deteriorates to lower the quality of a reproduced picture.

SUMMARY OF THE INVENTION

A general object of this invention is to solve the above stated problems of the prior art.

It is a more specific object of this invention to provide a rotary head type reproducing apparatus which is capable of adequately performing a reproducing operation even in cases where there are guard bands between adjacent recording tracks and where the recording tracks of the record bearing medium have been deteriorated in linearity.

Under this object, an apparatus arranged as an embodiment of this invention to reproduce an information signal with rotary heads from a record bearing medium on which the information signal and pilot signals are recorded in many parallel recording tracks comprises a plurality of rotary heads including three heads which are arranged to be capable of tracing different parts of the tracks differing both in the longitudinal and transverse directions of the tracks; first means for forming a first tracking error signal on the basis of the pilot signals reproduced by the first of the three heads which is positioned in the middle of the track from second and third tracks which are located on both sides of said first track; second means for forming a second tracking error signal on the basis of the pilot signals reproduced by the second and third of the three heads which are other than the first head from second and third tracks; and control means for controlling the positions of the plurality of heads relative to the position of the record bearing medium by using both the first and second tracking error signals.

The above and other objects and features of the invention will become apparent from the following detailed description of an embodiment thereof taken in connection with the accompanying drawings.

DETAILED DESCRIPTION OF PREFERRED EMBODIMENT

Figure 1:
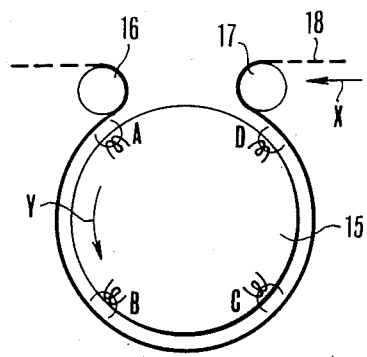
FIG. 1 is an illustration of an arrangement of a rotary drum which is of a small diameter and has a plurality of magnetic heads mounted thereon.
Figure 2:
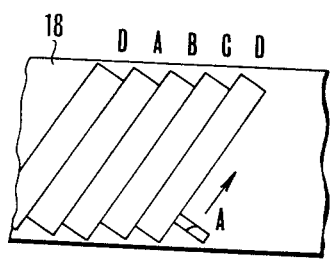
FIG. 2 shows a recording track pattern obtained on a magnetic recording tape having no guard band between tracks.
Figure 3:
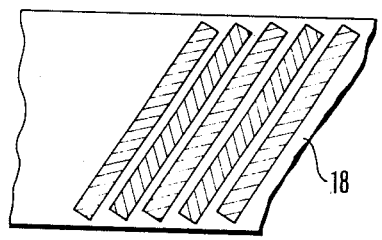
FIG. 3 shows a recording track pattern obtained on a recording tape having guard bands between tracks.
Figure 4:
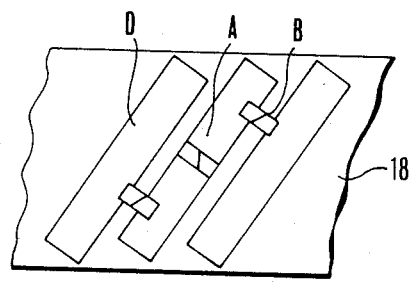
FIG. 4 shows the positions of heads on a tape employed as a record bearing medium.
Figure 5:
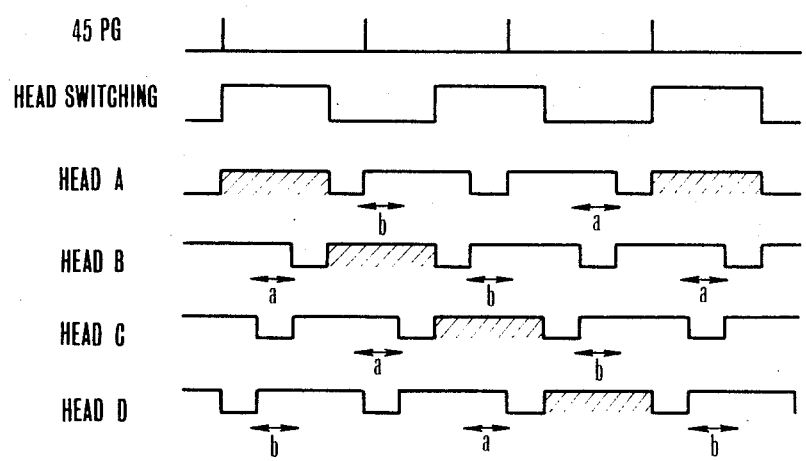
FIG. 5 is a timing chart showing a timing at which use of the plurality of heads of FIG. 2 are switched from one head over to another.
Figure 6:
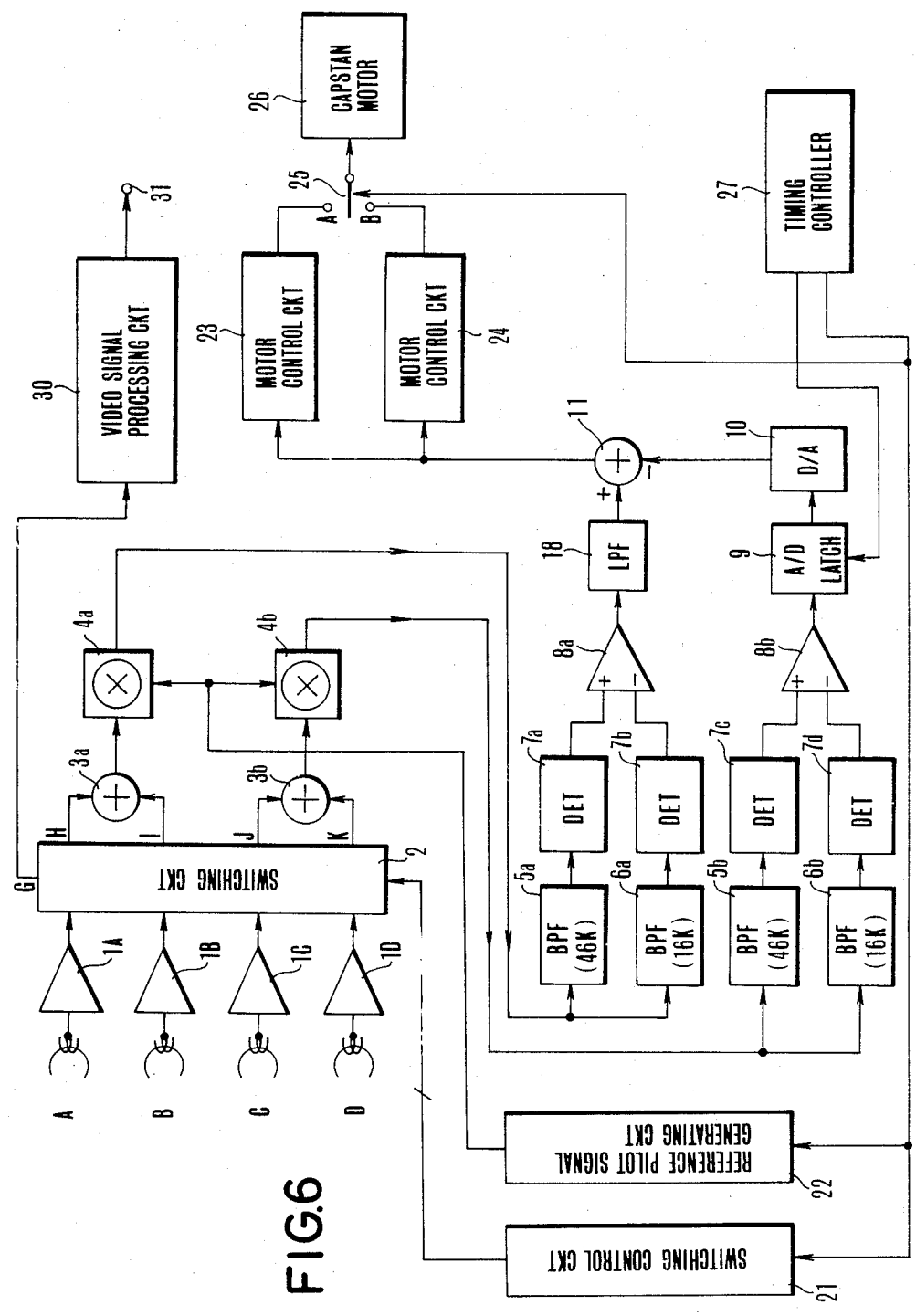
FIG. 6 is is a block diagram showing in outline a VTR arranged as an embodiment of this invention.

Referring to FIG. 6 which shows a VTR in a block diagram as an embodiment of this invention, reference symbols A, B, C and D denote magnetic heads. Amplifiers 1A, 1B, 1C and 1D are arranged to amplify the outputs of the magnetic heads A, B, C and D. A switching circuit 2 is arranged to allocate the outputs of the amplifiers 1A, 1B, 1C and 1D top its output terminals H, I, J and K. Adders 3a and 3b are arranged to add the outputs H and I of the circuit 2 together and the outputs J and K of the circuit 2 together respectively. Multipliers 4a and 4b are arranged to multiply the outputs of the adders 3a and 3b by a reference pilot signal which is produced from a known reference pilot signal generating circuit 22 at the same frequency as the frequency of a pilot signal recorded in a track which is under control respectively. Band-pass filters (hereinafter referred to as BPFs) 5a and 5b are arranged to limit the frequency band of the outputs of the multipliers 4a and 4b with a center frequency set at 46 KHz. BPFs 6a and 6b are arranged to limit the frequency band of the outputs of the multipliers 4a and 4b with a center frequency set at 16 KHz. Detection circuits (hereinafter referred to as DETs) 7a, 7b, 7c and 7d are arranged to take out envelope components from the outputs of the BPFs 5a, 5b, 6a and 6b. Differential amplifiers 8a and 8b are arranged to amplify a difference between the outputs of the DETs 7a and 7b and a different between the outputs of the DETs 7c and 7d respectively. An A/D latch 9 is arranged to convert the analog output of the differential amplifier 8b into a digital signal. A D/A converter 10 is arranged to convert the digital output of the A/D latch 9 into an analog signal. An arithmetic device 11 is arranged to subtract the output of the D/A converter 10 from the output of the differential amplifier 8a obtained via a low-pass filter (LPF) 18. Motor control circuits 23 and 24 are arranged to use as a control signal the outputs of the arithmatic device 11. A switching control circuit 21 is arranged to form a switching timing control signal for controlling the switching timing of the above stated switching circuit 2. A numeral 25 denotes a switch. A numeral 26 denotes a capstan motor. A timing controller 27 is arranged to control the operation timing of the various applicable parts.

With the embodiment arranged in this manner, when reproduction in a first mode is to be initiated, the switch 25 is shifted to one connecting side A. Then, a switching signal is produced at a high level from the switching control circuit 21. At this time, the capstan motor 26 is not moving the tape under the control of the control circuit 23. Then, tracking control is performed in such a way as to cause the magnetic head A to trace tracks from which recorded signals are to be reproduced. In this instance, the magnetic head D which traces the tape ahead of the head A by 90 degrees scans by straddling a track located in front of the track being scanned by the head A. Another head B which traces the tape behind the head A by 90 degrees likewise scans by straddling a track located in rear of the track being scanned by the head A. The heads A, B and D then obtain reproduced signals including pilot signals. The reproduced signals are sent out via the amplifiers 1A, 1B and 1D to the switching circuit 2.

The switching circuit 2 produces the output of the magnetic head A at its output terminals H and G while the above stated switching signal is at a high level. Meanwhile, the output of the magnetic head D is produced at the output terminal J of switching circuit 2 and that of the head B at the output terminal K of the circuit 2.

The output produced at the output terminal H is supplied via the adder 3a to the multiplier 4a to be multiplied by the reference pilot signal. Likewise, the outputs produced at the output terminals J and K of the circuit 2 are supplied to the multiplier 4b to be multiplied by the reference pilot signal after they are added together by the adder 4b. Signals produced from the multipliers 4a and 4b are supplied to the BPFs 5a, 5b, 6a and 6b which are respectively arranged to separate difference frequencies representing the differences of the reproduced pilot signal of the track under control from the reproduced pilot signal of two tracks adjoining the track under control on both sides thereof. The BPFs 5a, 5b, 6a and 6b then produce signals which have amplitudes corresponding to the levels of the pilot signals reproduced from the two tracks adjoining the track under control. The outputs of these BPFs are supplied to the DETs 7a, 7b, 7c and 7d to have their envelope components detected.

The envelope components of four channels which are thus detected are supplied to the differential amplifiers 8a and 8b to have differences between each of pairs of the envelope components amplified by the differential amplifiers 8 and 8b. The output of one of the amplifiers 8a and 8b is supplied via the LPF 18 to the arithmetic device 11 while that of the other is supplied to the A/D latch 9 which performs a converting and latching function. At that time, a signal of zero level is supplied from the D/A converter 10 to the arithmetic device 11. The motor control circuit 23 causes the capstan motor 26 to bring the travel of the tape to a stop in such a way as to make the output of the LPF 18 zero. After that, the signal supplied to the A/D converter 9 is converted into a digital signal. Then, with a latch pulse supplied from the timing controller 27 to the A/D latch 9, the digital signal is latched. As a result, a signal of a constant level is provided from the A/D latch 9 and is supplied to the D/A converter 10 to be converted again into an analog signal. At that point of time, the embodiment shifts to a second mode.

The above stated latching takes place when the head A is tracing the middle part of the track in the longitudinal direction thereof. Therefore, if the magnetic head A is in an ideal position in tracing the tape in the longitudinal direction thereof, there will be obtained a DC component which corresponds to a level difference between the pilot signals reproduced by the heads B and D from the above stated two adjoining tracks. This DC component is supplied, in the second mode, to the arithmetic device 11 to be added to the tracking error signal there.

With the reproducing operation of the embodiment shifted to the second mode, the connecting position of the switch 25 shifts to another side B thereof. As a result, the capstan motor 26 causes the tape to travel at a speed that allows the heads to trace the tape in parallel to the tracks. The level of the above stated switching signal becomes low. A reproduced signal obtained by the reproducing head comes to be produced at the output terminal G of the switching circuit 2. Reproduced signals obtained by the front and rear heads come to be produced at other output terminals H and I of the circuit 2. In that instance, the signal produced from the output terminal G is supplied to a video signal processing circuit 30 and is then produced from a terminal 31 as a reproduced video signal. Meanwhile, a signal corresponding to the level difference between the pilot signals reproduced by the above stated front and rear heads from the above stated two adjoining tracks is applied to the arithmetic device 11 via a route consisting of and in the order of the adder 3a, the multiplier 4a, the BPFs 5a and 6b, the DETs 7a and 7b, the differential amplifier 8a and the LPF 18.

The arithmetic device 11 has the above stated DC component applied thereto. With the reproducing operation of the embodiment having been shifted to the second mode, a tracking error signal is obtained on the basis of the pilot signals reproduced by the front and rear heads, i.e. two heads disposed before and after the reproducing head, from the tracks adjoining the track under control on both sides thereof. The tracking error signal thus obtained and the above stated DC component are subjected to a computing operation to obtain a tracking control signal. The output of the arithmetic device 11 is supplied to the motor control circuit 24 to control the capstan motor 26 via one side B of the switch 25. The DC component is further described as follows:

If the reproducing head is in an ideal tracing position or having an ideal tracing locus in the first mode, the DC component represents a degree of mismatch or discrepancy included in the tracking error signal obtained from the signals reproduced by the heads disposed before and after the reproducing head due to the impaired linearity or the like mentioned in the foregoing. Therefore, the value of this degree of mismatch is retained. After that, in the second mode, this value is subtracted from the tracking error signal obtained by the two heads. An ideal tracking signal can be obtained by this arithmetic operation.

The apparatus which is arranged according to this invention as described in the foregoing is capable of performing tracking control even in cases where recorded signals are reproduced from such magnetic tapes that have guard bands between recording tracks or have recording tracks of deteriorated linearity.

What is claimed is:

1. An apparatus for reproducing information with rotary heads from a record bearing medium on which an information signal and pilot signals are recorded in many parallel recording tracks, comprising:
   (a) a plurality of rotary heads including first, second and third heads which are arranged to be capable of simultaneously tracing different parts of said tracks, differing both in longitudinal and transverse directions of said tracks;
   (b) reproducing means for reproducing said information signal by using said first head;
   (c) first means for forming a first tracking error signal on the basis of pilot signals reproduced from the second and third tracks which are located on both sides of a first track by the first head positioned between the second and third heads;
   (d) second means for forming a second tracking error signal on the basis of pilot signals reproduced from said second and third tracks by the second and third heads; and
   (e) control means for controlling the positions of the plurality of heads relative to a position of said record bearing medium by using both said first and second tracking error signals.

2. An apparatus according to claim 1, wherein said control means includes:
   a first control circuit arranged to control the position of said record bearing medium relative to the positions of said plurality of heads by using only said first tracking error signal formed by said first means when the apparatus is in a first mode;
   a storage circuit which is arranged to store said second tracking error signal formed by said second means when the apparatus is in said first mode; and
   a second control circuit which is arranged to control the position of said record bearing medium relative to the positions of said plurality of heads by using said second tracking error signal formed by said second means together with said second tracking error signal stored by said storage circuit when the apparatus is in a second mode.

3. An apparatus according to claim 2, further comprising moving means for moving said record bearing medium, said moving means being arranged to cause said medium to travel at a first speed when the apparatus is in said first mode and at a second speed which differs from said first speed when the apparatus is in said second mode.

4. An apparatus according to claim 3, wherein said second speed is set to cause said plurality of rotary heads to trace the surface of said record bearing medium in parallel with a longitudinal direction of said tracks.

5. An apparatus according to claim 4, wherein said first speed is zero.

6. An apparatus for reproducing an information signal from a record bearing medium on which many tracks are formed in parallel to each other, comprising:
   (a) an n number of rotary heads, each having a rotation phase differing by (360/n) degrees from another, said n number being an integer more than 3;
   (b) reproducing means for reproducing said information signal by selectively using said n number of heads in rotation;
   (c) first means for forming a first tracking error signal on the basis of a signal reproduced by one of said heads which is used by said reproducing means;
   (d) second means for forming a second tracking error signal on the basis of signals reproduced by two of said heads, one rotating (360/n) degrees ahead of the head used by said reproducing means and the other rotating (360/n) degrees behind the head used by said reproducing means; and
   (e) control means for controlling the position of said record bearing medium relative to the positions of said n number of rotary heads using both said first tracking error signal and said second tracking error signal.

* * * * *